United States Patent [19]
Kawamura

[11] Patent Number: 5,107,951
[45] Date of Patent: * Apr. 28, 1992

[54] DEVICE FOR DRIVING FOUR WHEELS OF CAR AT ALL TIMES

[75] Inventor: Osamu Kawamura, Matsudo, Japan

[73] Assignee: Shinwa Sangyo Co., Ltd., Matsudo, Japan

[ * ] Notice: The portion of the term of this patent subsequent to Nov. 28, 2007 has been disclaimed.

[21] Appl. No.: 32,324

[22] Filed: Mar. 31, 1987

[30] Foreign Application Priority Data

| Mar. 9, 1986 | [JP] | Japan | 62-51893 |
| Mar. 31, 1986 | [JP] | Japan | 61-70879 |
| Sep. 22, 1986 | [JP] | Japan | 61-220973 |
| Oct. 13, 1986 | [JP] | Japan | 61-241546 |
| Oct. 27, 1986 | [JP] | Japan | 61-253767 |
| Nov. 17, 1986 | [JP] | Japan | 61-271884 |
| Dec. 8, 1986 | [JP] | Japan | 61-290329 |

[51] Int. Cl.⁵ .......................................... B60K 17/34
[52] U.S. Cl. ................................. 180/248; 180/233; 475/221; 475/222; 475/230
[58] Field of Search .............. 180/233, 244, 248; 74/665 T; 475/221, 222, 230, 6

[56] References Cited

U.S. PATENT DOCUMENTS

| 1,344,107 | 6/1922 | Wilkin | 475/222 |
| 1,425,734 | 8/1922 | Wyman | 180/248 |
| 1,468,338 | 9/1923 | Wyman | 475/221 |
| 2,514,071 | 7/1950 | Jusky | 475/222 |
| 4,574,656 | 3/1986 | McCarthy | 475/6 |

FOREIGN PATENT DOCUMENTS

| 3000128 | 10/1980 | Fed. Rep. of Germany | 475/230 |
| 0198521 | 9/1987 | Japan | 180/233 |
| 0126044 | 9/1949 | Sweden | 180/233 |

Primary Examiner—Charles A. Marmor
Assistant Examiner—A. M. Boehler
Attorney, Agent, or Firm—Robert E. Burns; Emmanuel J. Lobato

[57] ABSTRACT

There is disclosed a device for driving four wheels of a car at all times. In this device, a differential is provided between the left front wheel shaft and right rear wheel shaft and likewise a differential is also provided between the right front wheel shaft and left rear wheel shaft so that said two differentials can be driven by the same driving source.

4 Claims, 15 Drawing Sheets

FIG.7
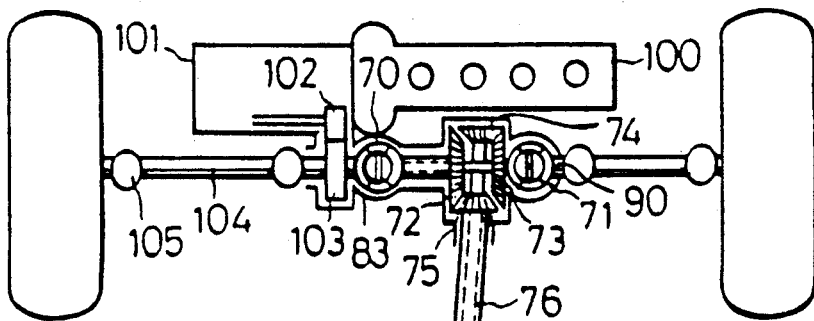
FIG.8
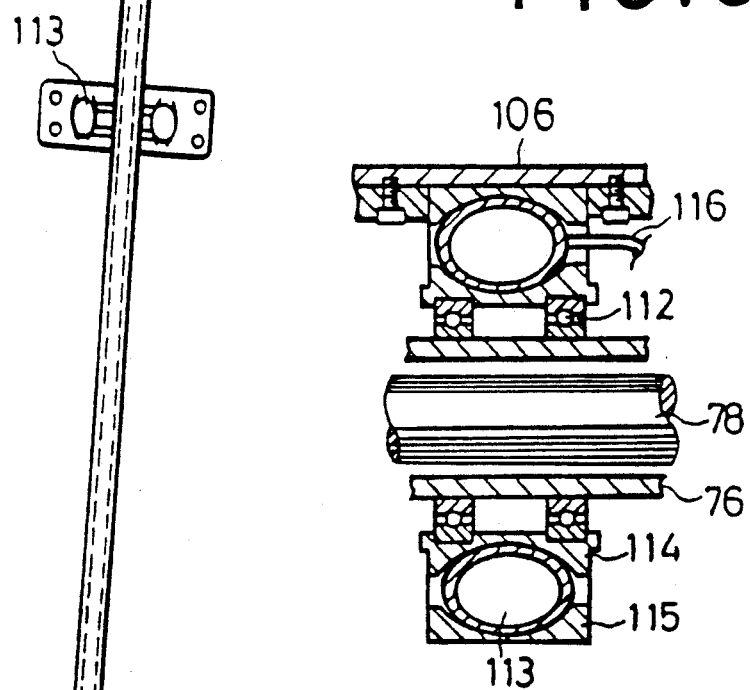
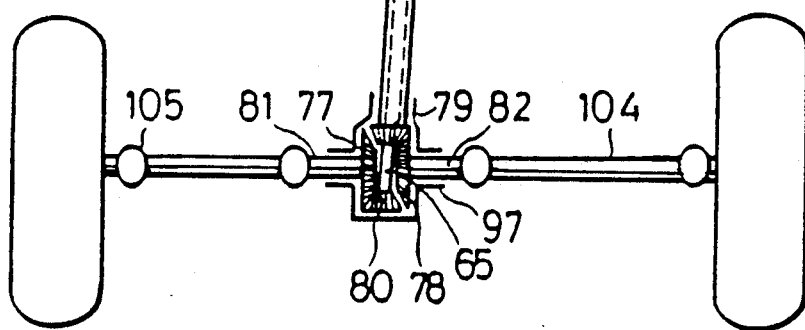

DEVICE FOR DRIVING FOUR WHEELS OF CAR AT ALL TIMES

BACKGROUND OF THE INVENTION

This invention relates to a device for driving four wheels of a car and more particularly to a device for driving four wheels at all times, suitable for use in passenger cars.

It has heretofore been customary for a long period of time that the so-called selective system is mainly used in four-wheel passenger cars wherein the driver operates to switch a rigid 4 WD for direct connection between the front and rear steel shafts and 2 WD for driving only one of the wheel shafts by releasing the aforesaid connection.

However, along with the fact that the merit of four-wheel drive on the usual road has been recognized as important, the drawbacks of the selective system have become also recognizable. Such drawbacks are concerned with the problem of tight-turn braking. Namely at the time of turning the car, the front wheels and rear wheels depict circles of different radii, thus causing different distances of their movements so that the difference in rotation of the wheels cannot be avoided. In order to avoid such inconvenience, it becomes necessary to incorporate differential gears between the front and rear wheel shafts. In this way, shifting operation of 2 WD and 4 WD may be dispensed with. However, in the case of differential gears consisting of usual bevel gears or planetary gears, the structure concerned is such as to delay the rotation of the resistance-loaded shaft so that when counter force on one-side output shaft becomes less, the shaft will rotate idly until relative driving force is lost. Therefore, in order to prevent the aforesaid condition assuredly in the case of the center-differential 4 WD, such a mechanism becomes necessary as a differential lock or limited slip system. Yet, the center-differential 4 WD becomes complicated in construction and moreover, there occurs the drawback of a braking phenomenon at the time of locking. On the other hand, there is a viscous coupling structure for transmitting torque by utilizing the shearing resistance of viscous fluid (silicon oil).

In this case, although the viscous coupling can transmit torque when there is a difference in rotary speed while the input shaft and output shaft are rotating in an integral manner, yet the size of torque is changed according to a change in rotary speed, namely according to the speed at which the plate shears silicon oil. However, there occurs energy loss due to an exothermic condition on one hand and on the other hand, after the idle rotation or stoppage of one wheel alone has occurred, the other wheels initiate an increase in speed so that the drawback of the time lag is raised. Still as another process, the Torsen center-differential system may be available. Also in this case, there occurs such drawbacks as a tendency of rotary lowering due to the use of worm gears and overload of torque distribution on the right and left rear wheels or front wheels at the time of idle rotation. Even in the case of adopting any one of the aforesaid processes, the idle rotation or stoppage of one wheel only can not be prevented nor can be a proper distribution of torque be ensured after all.

All the aforegoing conditions stand much in the way of propagation of 4 WD cars because of complicated construction and high cost.

OBJECT OF THE INVENTION

The principal object of the present invention is to provide a device for driving four wheels of a car at all times, ensuring the availability of simple construction and accurate operation.

Another object of the invention is to provide a device for driving four wheels of a car at all times, requiring neither a differential lock nor a limited slip.

Still another additional object of the invention is to provide a device for driving four wheels of a car at all times, causing no possibility of stop or idle rotation of one wheel but ensuring a proper distribution of torque under any conditions at all times.

BRIEF DESCRIPTION OF DRAWINGS

Other objects and advantages in addition to those above-mentioned will be sufficiently understood from consideration of an explanation made hereinbelow with reference to the accompanying drawings.

FIGS. 1-3 show a preferred embodiment of the present device for use in a car with longitudinal installation of an engine, wherein:

FIG. 1 is a plan view of a preferred embodiment of double-differential device for use in a car with longitudinal installation of an engine;

FIG. 2 is a plan view of a power train illustrated in skeletal form; and

FIG. 3 is a plan view of the structure of a front speed-reduction gear box.

FIGS. 6-11 show a preferred embodiment for use in a car with transverse installation of an engine;

FIG. 6 is a plan view of a preferred embodiment of double-differential device for use in a car with transverse installation of an engine;

FIG. 7 is a general plan view of a power train illustrated in skeletal form;

FIG. 8 is a cross section of a support member for the double shaft according to the present invention;

FIG. 9 is a plan view of the structure of a rear speed-reduction gear box;

FIG. 10 is a plan view of another preferred embodiment of double-differential device for use in a car with transverse installation of an engine; and FIG. 11 is a general plan view of a power train illustrated in skeletal form.

FIGS. 12-13 show a preferred embodiment of differential device for use in an off-road car, wherein;

FIG. 12 is a plan view of double-differential device of preferred embodiment for use in an off-road car; and FIG. 13 is a general plan view of a power train illustrated in skeletal form.

FIGS. 14-15 show a preferred embodiment of double-differential device by incorporating worm gears in a spur gear wherein:

FIG. 14 is a plan view of double-differential device; and

FIG. 15 is a cross-section thereof taken at the line A—A of FIG. 12.

DETAILED DESCRIPTION OF THE INVENTION

Figure 1:
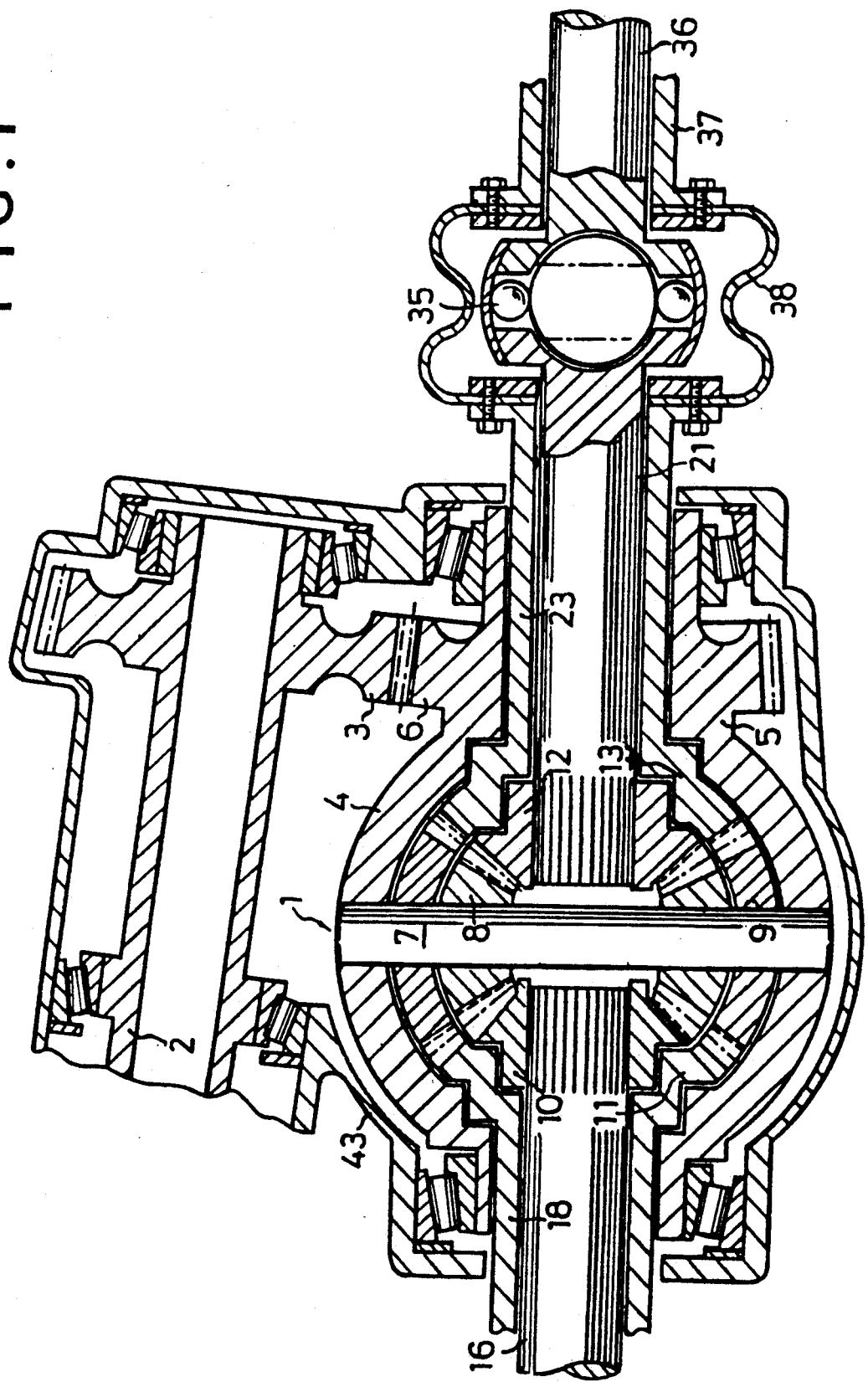
Figure 2:
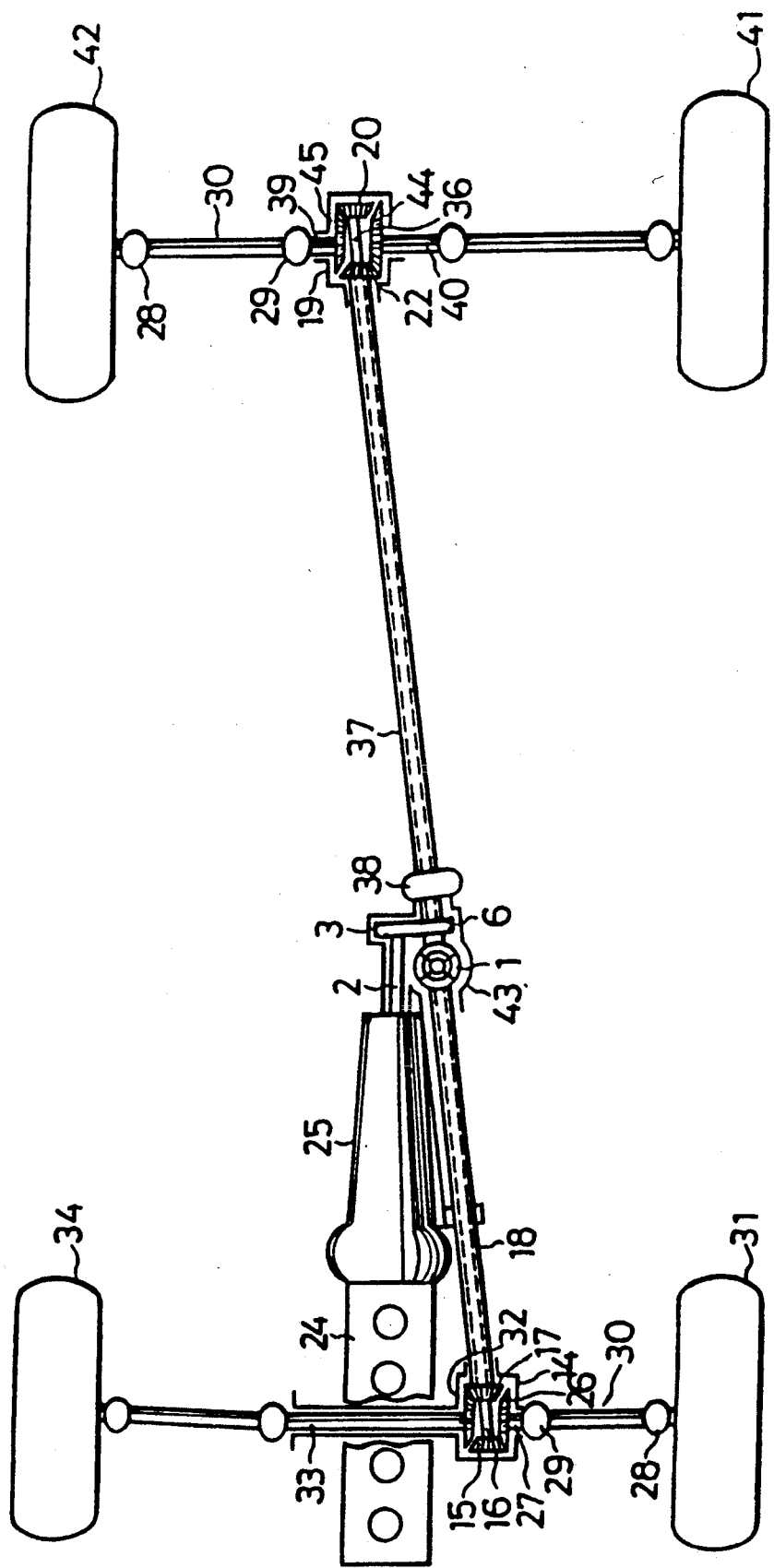
Figure 3:
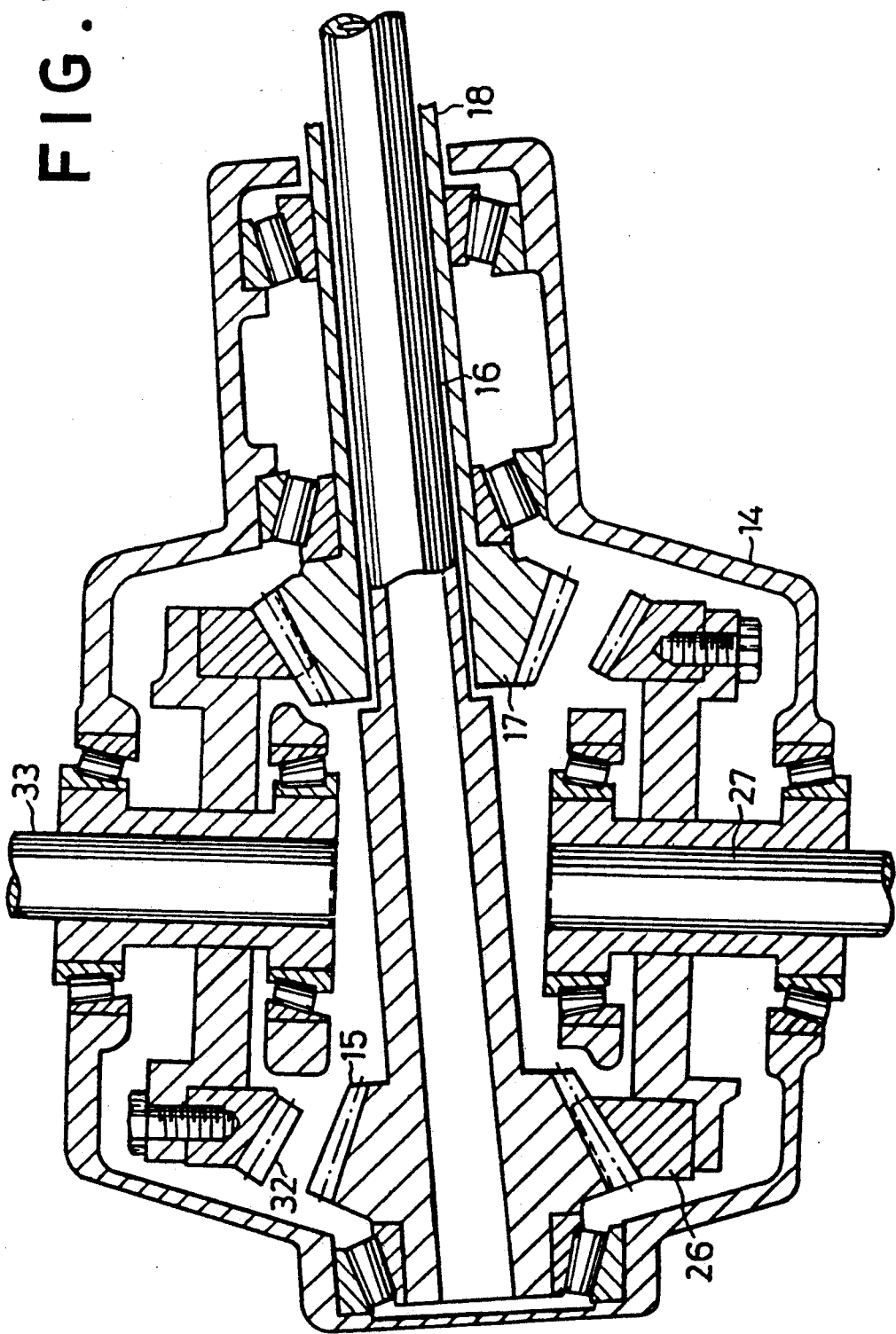

To begin with, the first preferred embodiment of the present invention will be explained with reference to FIGS. 1-3. The differential device between the left front wheel shaft 27 and the right rear wheel shaft 39 uses a planetary gear mechanism. Likewise, the differential device between the right front wheel shaft 33 and the left rear wheel shaft 40 uses a planetary gear mechanism. These two differential devices are combined in a body to form a double-differential device.

The drive gear 3 on the transmission shaft 2 of said double-differential device is inclined at an angle of 7° to the annular shaft 5 of the planetary carrier 4 so as to drive said double differential device through the spiral gear 6. Each two inner and outer planetary gears 8, 9 are provided at the left shaft 7 on the planetary carrier 4 and adapted to mesh with the inner and outer front side gears 10,11 and the inner and outer rear side gears 12, 13. As shown in FIG. 2, the front and rear shafts 16, 18, 36, 37 are hollow providing a double construction wherein the inner shafts 16,36 are thoroughly inserted in the outer shafts 18,37. The front and rear shafts 16, 18, 36, 37 are provided in a manner inclined to the front and rear wheel shafts.

The front inner shaft 16 of the left pinion 15 in the front speed-reduction gear box 14 is directly connected with the inner front gear 10 for cooperative rotation and the front outer shaft 18 of the right pinion 17 is directly connected with the outer front side gear 11 for cooperative rotation. The rear inner shaft 36 of the right pinion 20 in the rear speed-reduction gear box 19 of the same structure as mentioned above is adapted to rotate with the outer inner rear side gear 12, and the rear outer shaft 37 of the left pinion 22 is adapted to rotate with the outer rear side gear 13. In this case, each pinion 15, 17, 20, 22, the right and left front hypoid gears 26,32 and the right and left rear hypoid gears 44,45 have quite the same diameter, thus lowering the manufacturing cost and enabling them to be housed compactly in the front and rear speed-reduction boxes 14,19.

The operation of the device of the present invention will be explained in further detail hereinafter.

Figure 17:
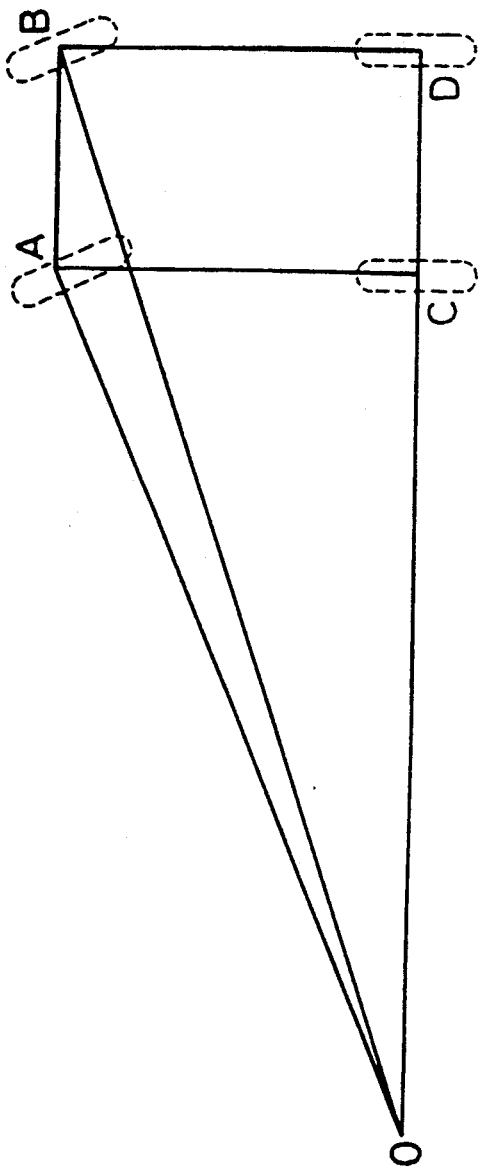
FIG. 17 is a view showing the relationship between the distances of four wheels from the central point B of rotation at the time of left turn of the car.

As shown in FIG. 17, a length is obtained by half-dividing the addition of the distance OA between the central point O and the left front wheel A and the distance OD between the central point O and the right rear wheel D. Said obtained length in almost equal to a length to be obtained by half-dividing the addition of the distance OB between the central point O and the right front wheel B and the distance OC between the central point O and the left rear wheel C at the time of left turn of the car as shown below, $$\left( \frac{OA + OD}{2} \approx \frac{OB + OC}{2} \right)$$

wherein the larger the radius becomes, the smaller will be the approximate difference in equality.

Therefore, in the case of providing a differential device each between the right front wheel and the left rear wheel and also between the left front wheel and the right rear wheel, both differential devices can be driven by the same driving source.

Accordingly, in the aforesaid preferred embodiment, the output of the engine 24 is sure to act in such a manner that the drive gear 3 can rotate the inner and outer planetary gears 8,9 of double-differential device 1 at a time through the spiral gear 6 and the carrier shaft 7 via the transmission 25. Then the left pinion 15 acts to drive the left front shaft 27 through the speed-reduction and left front hypoid gear 26 (or spiral gear) so that the rotation of the left front shaft 27 can be transmitted to the left front wheel 31 through ball joints 28, 29 and the propeller shaft 30. At the same time, the right pinion 17 acts to rotate the right front shaft 33 through the right front hypoid gear 32. Likewise, the right pinion 20 acts to rotate the right rear shaft 39 and the left pinion 22 acts to rotate the left rear shaft 40 respectively. In this way, two actuating rotations can be effected by the rotation of the same carrier shaft 7 between the left front shaft 27 and the right rear shaft 39 and between the right front shaft 33 and the left rear shaft 40. In this case, since the front speed-reduction gear box 14 is integrally affixed to the left lower part of the engine 24, there is no need for the provision of a universal joint on half-way of transmission of the inner shaft 16 and the hollow shaft 18 thereby to make the structure so simplified. The inner shaft 21 cooperatively rotates the rear inner shaft 36 through the ball joint 35, and the outer shaft 37 at the external circumference thereof serves to transmit rotation merely and therefore, it is rotated cooperatively by the hollow shaft 23 through the rubber coupling 38 of simple construction. In the preferred embodiment shown in the drawing, the rear outer shaft 37 and the rear inner shaft 36 serve to directly drive the right and left pinions 22,20 but it is also possible to provide the ball joint 35 and the rubber coupling 38, either one or a plurality of such couplings which may be secured to the body (not shown) by means of metal members. Also the rear outer shaft 37 of double shaft may be annularly disposed outside in a manner concentric with the rear inner shaft 36 to be connected thereto by means of the ball joint 35. In order to eliminate a difference in resistance of inertia, the outer shaft 37 made of light alloy may be supported at the body (not shown) by means of fixing metal members. Moreover, in the preferred embodiment in the drawing, rotation from the right and left rear shafts 39, 40 serves to drive the right and left rear wheels 41,42 through the ball joint 28 and the propeller shaft 30 in a manner similar to the case of the right and left front shafts 27,33 but it is also possible to replace them with rigid axles and these elements can be modified according to various objects. It is also possible to use a spiral gear for one of the front and rear speed-reduction gears or spiral gears for both.

Figure 4:
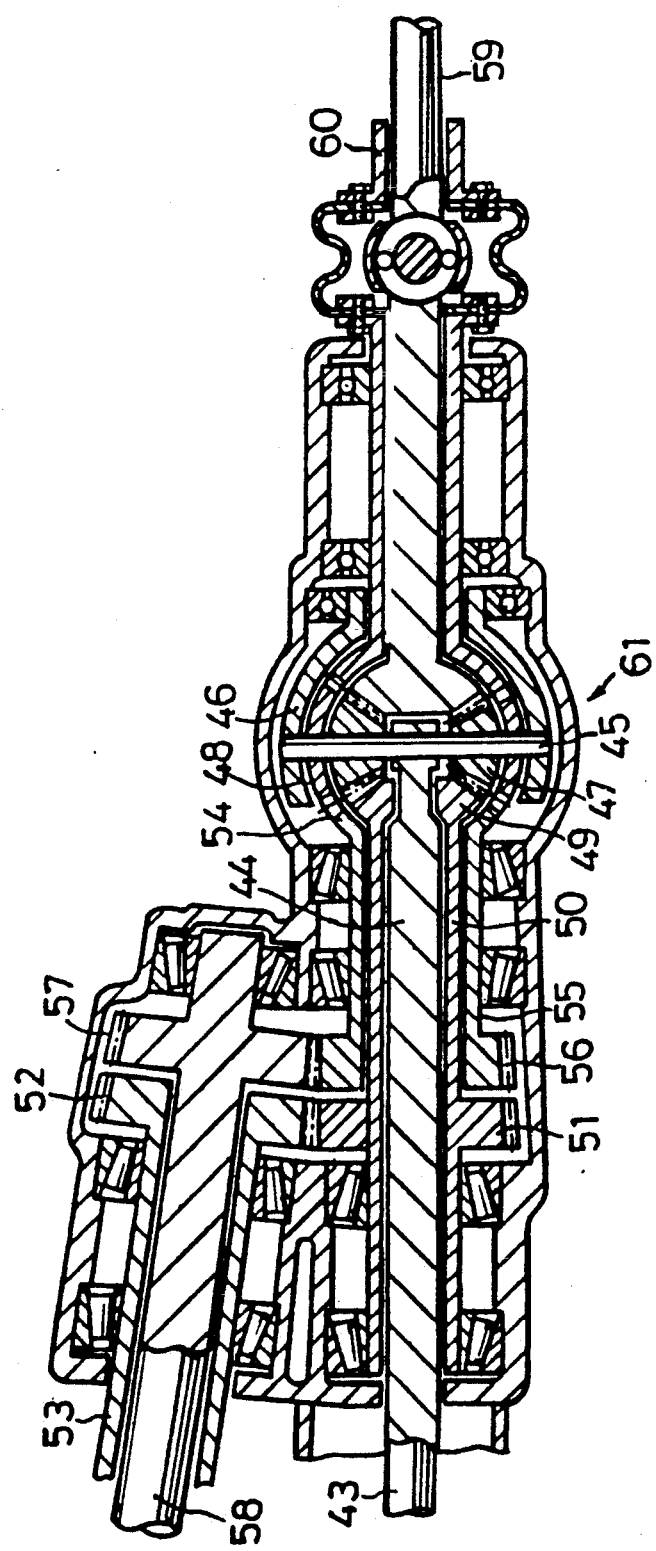
FIG. 4 is a plan view of a double-differential device for use in another preferred embodiment of the present invention.

Another preferred embodiment will be explained with reference to FIG. 4 hereinbelow.

The main shaft 44 on the extension of the transmission shaft 43 can rotate the annular planetary carrier 46 and the inner and outer front planetary gears 47,48 through the planetary carrier shaft 45.

The inner front planetary gear 47 can rotate the front drive gear 51 (spiral gear) through the inner front side gear 49 and the annular shaft 50. Then said drive gear 51 can drive the front driven gear 52 (spiral gear of the same diameter) thereby driving the outer shaft 53 integral therewith. On the other hand, the outer front planetary gear 48 can rotate the rear drive gear 56 through the outer front side gear 54 and the annular shaft 55.

Then said drive gear 56 can rotate the rear driven gear 57, thus rotating the inner shaft 58 integral therewith.

The aforesaid outer shaft 53 can rotate the left front shaft and the inner shaft 58 can rotate the right front shaft respectively. By the way, the driving of the right and left shafts 62,63 by the inner and outer shafts 59, 60 of double shaft directly through the right and left pinions 66,67 can be ensured in the same manner as foresaid first preferred embodiment.

In the present device, since the double-differential device 61 is rotated by the transmission shaft 43 at high speed before speed reduction, it can be made as a small size one and at the same time, by the use of spur gears (or spiral gears of small intersecting angle) for driving the right and left font shafts, there results an advantage of excellent transmission efficiency.

Figure 5:
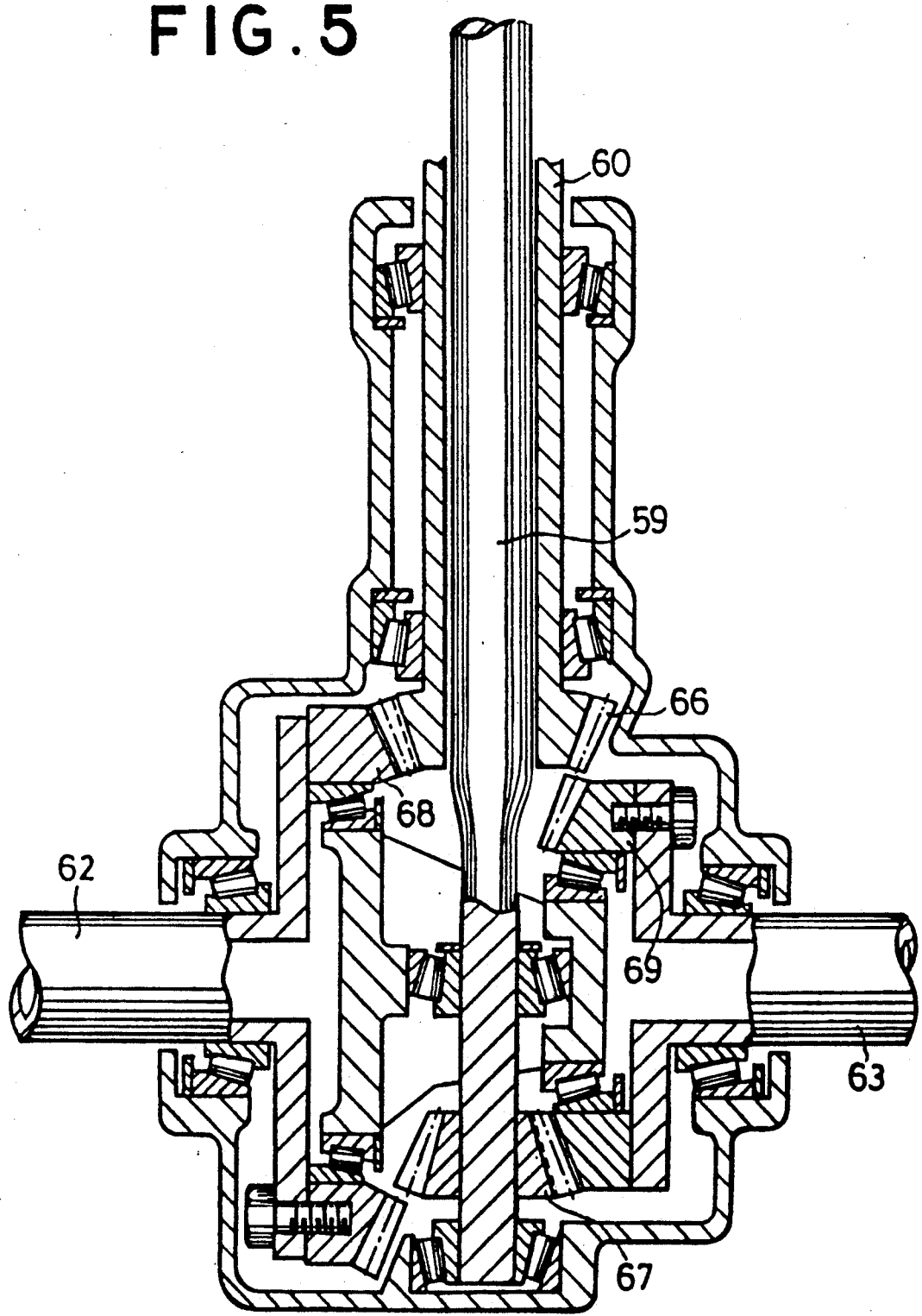
FIG. 5 is a plan view of the structure of a rear speed-reduction gear box in which a double shaft is disposed perpendicular to the shaft of the rear wheels.

FIG. 5 shows a preferred embodiment wherein the inner and outer shafts 59,60 of double shaft are provided at 90° to the right and left rear shafts 62, 63, and the right and left rear speed-reduction gears 68,69 of different radii are rotated by the right and left pinions 66,67 of different radii.

Figure 6:
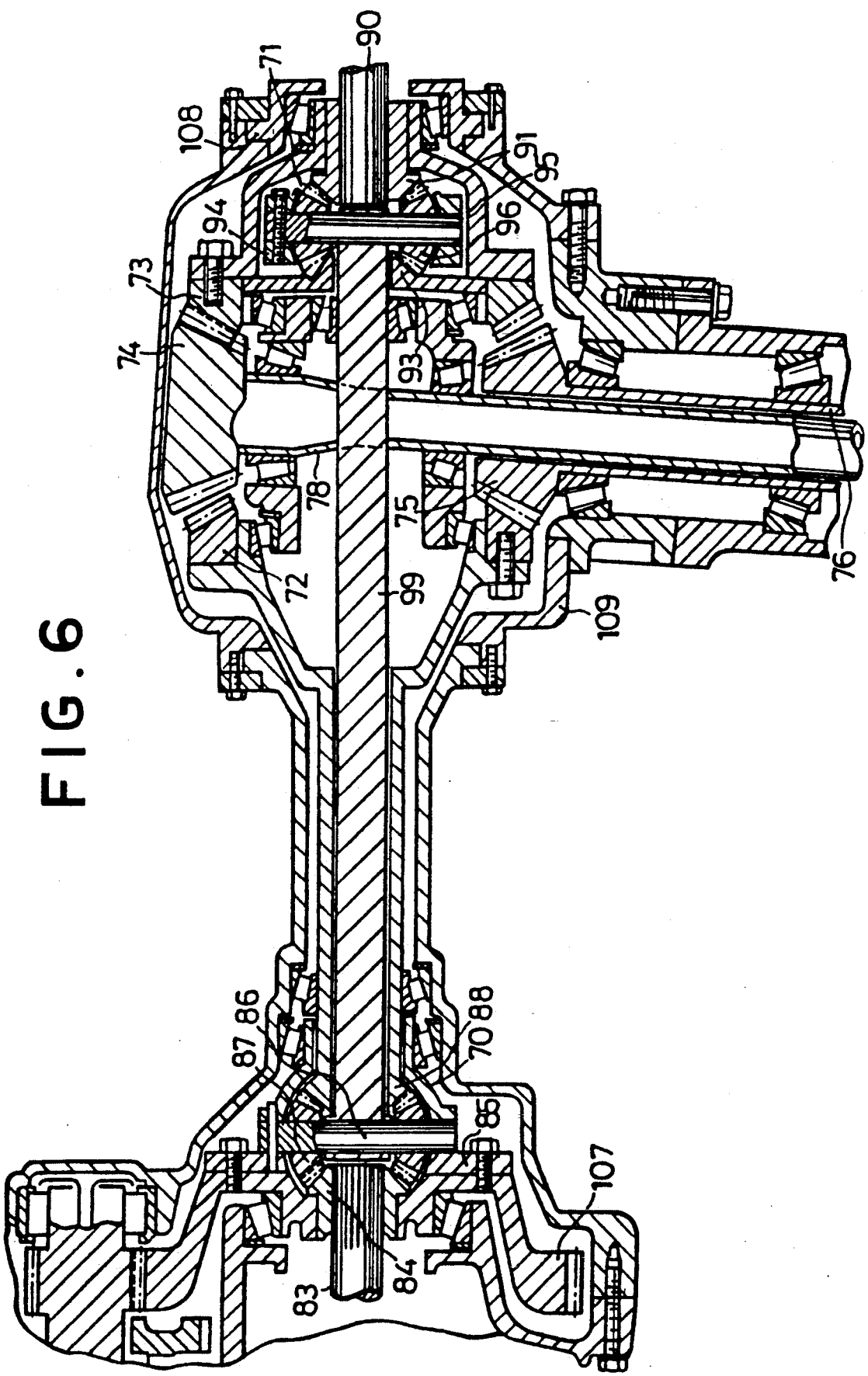

Next, the second preferred embodiment of the invention will be explained with reference to FIGS. 6-8 hereinafter.

Differential devices 70,71 are disposed on the front shaft as separated from each other to the right and left. The right and left speed-increasing hypoid gears 72,73 for accelerating the rotation of differential devices are adapted to mesh with the inner and outer shafts 78,76 of double concentricity as inclined 4° to each other through the pinions 74,75. The inner and outer shafts 78,76 have no intermediate universal joint but are in direct meshing with the right and left hypoid gears 77,65 through the pinions 79,80 so as to transmit the rotation of main shaft of the differential devices 70,71 to the right and left rear shafts 81,82.

The left middle side gear 84 of the right different device 70 for directly driving the left front shaft 83 is so constituted as to cause differential rotation with the left side gear 88 by the left planetary shaft 89 at the carrier shaft 86 on the left planetary gear 85. The left side gear 88 is directly connected with the left speed-increasing hypoid gear 72 for cooperative rotation so that the rotation of left speed-increasing hypoid gear 72 can be transmitted to the right gear shaft 82 by means of the outer shaft 76 of double shaft.

On the other hand, the right side gear 91 of right differential device 71 directly connected with the right front shaft 90 for cooperative rotation and the right middle side gear 93 directly connected with the right speed-increasing hypoid gear 73 for cooperative rotation are arranged to make differential rotation mutually by means of the right planetary gear 96.

Figure 9:
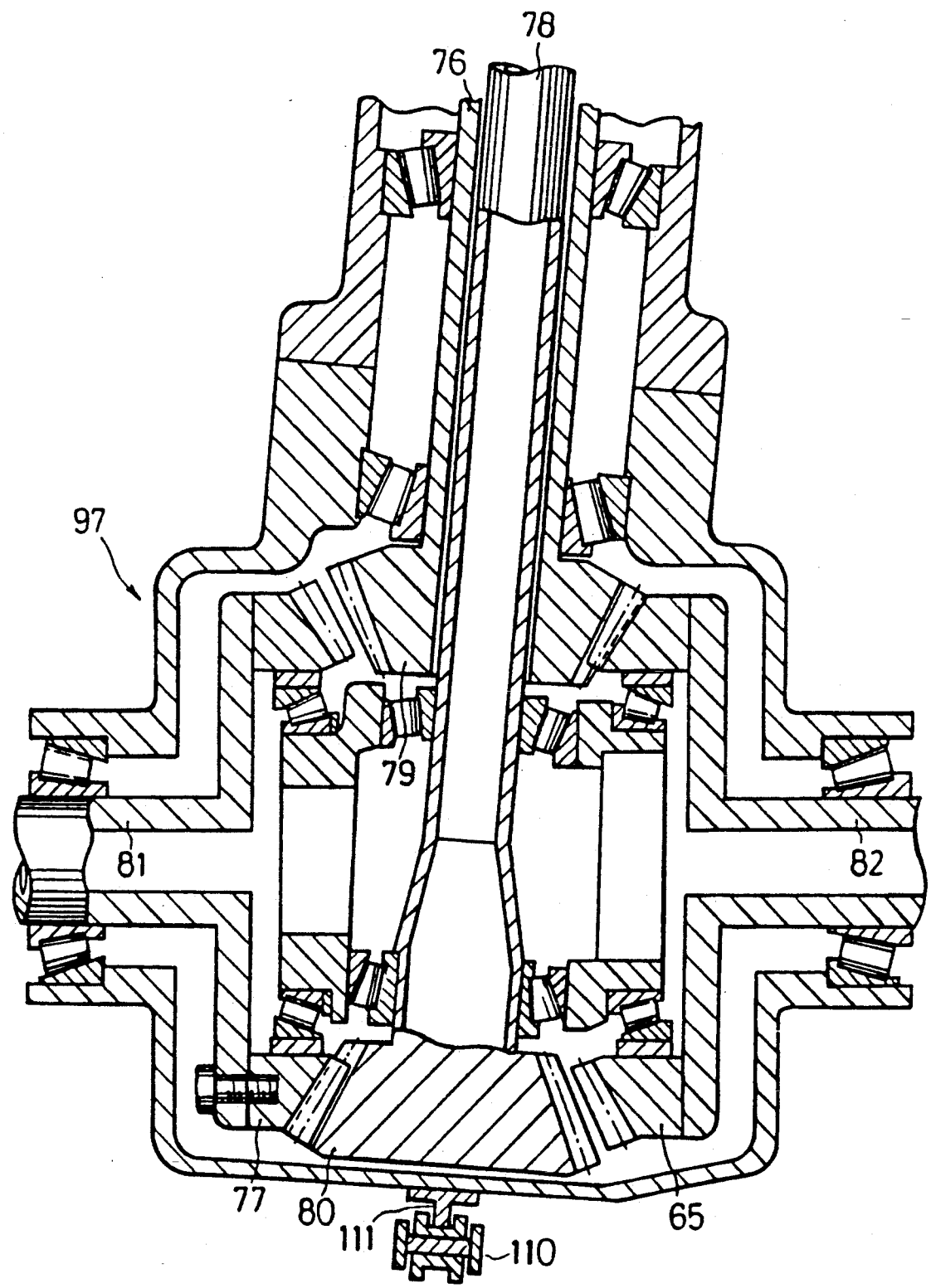

The rotation of the right middle side gear 93 can be transmitted to the left rear shaft 81 by means of the inner shaft 78. As shown in FIG. 9, the right and left speed-reduction hypoid gears 77,65 housed in the rear gear box 97 are of the same diameter and same shaft as the right and left speed-increasing hypoid gears 72,73 and the four pinions 74,75,79,80 in meshing therewith are also of the same diameter and same shape. Moreover, the pinions 75, 79 are connected together by the mutually concentric inner and outer shafts 78,76 and are so constituted as to rotate through splines (not shown). The inner and outer shafts 78,76 are provided as inclined 4° to the center line of the car.

Due to the use of the right and left speed-increasing hypoid gears 72,73 and the right and left speed-reduction gears 77,65, the two inner and outer shafts 78,76 can be disposed below the plane connecting the right and left front shafts 83,90 and the right and left front shafts 81,82 thus improving the loading and residing properties of the car.

The right and left planetary carrier 85,94 are directly connected with each other for cooperative rotation through the main shaft 99, intersecting the inner shaft 78 therebelow. The operation of the aforesaid preferred embodiment will be explained hereinbelow.

The output of the engine 100 serves to rotate the carrier shaft 86 of the right differential device 70 through the drive gear 102 and the large speed-reduction gear 103 via the transmission 101.

The left front shaft 83 and the right gear shaft 82 make differential rotation through the left middle side gear 88, the left speed-increasing hypoid gear 72, pinion 75, outer shaft 76, pinion 79 and right speed-reduction hypoid gear 65. Simultaneously, the right front shaft 90 and the left rear shaft 81 make differential rotation through the right middle side gear 93, the right speed-increasing hypoid gear 73, pinion 74, inner shaft 78, pinion 80 and left speed-reduction hypoid gear 77 by means of rotation of the same main shaft 99.

Therefore, as distinct from an automobile provided with a differential device using conventional differential gears, the present invention can provide a device for driving four wheels of a car at all times without the idle rotation of one wheel alone.

There is no intermediate universal joint at the inner and outer shafts 78,76 and the vibration of the car body can be reduced mainly by means of the ball joins 105 disposed at both ends of the propeller shaft 104 provided on the extension of the right and left front wheel shafts 83,90 and the right and left rear wheel shafts 81,82.

Also, since the inner and outer shafts 78,76 can prevent the vibration of the engine 100 and the transmission of delicate up-and down movement of the rear gear casing 97 to the body 106, thanks to the movable sleeve 108 disposed near the casing 107, the front gear casing 109 is so provided as to rotate at a small angle around the main shaft 99 as the center. The rear gear casing 97 is so provided as to make some extent of up-and down movement through the rail 11 rearwardly of the rear gear casing 97 in contact with the well-known roller 110 (See FIG. 9).

Together with such mechanism of the rear gear casing, the inner and outer shafts 78,76 permitting some up-and down movement are provided with at least more than one ball bearing 112 in an intermediate position as shown in FIG. 8. The air-filled annular rubber tube 113 of an elliptical cross section is disposed at the lower part of the car body 106 through receiving rings 114,115 so as to prevent the transmission of the aforesaid vibration to the car body and simultaneously it acts in support of load on the outer shaft 76 of light alloy and the inner shaft 78 of steel to make resistance of inertia uniform.

Figure 10:
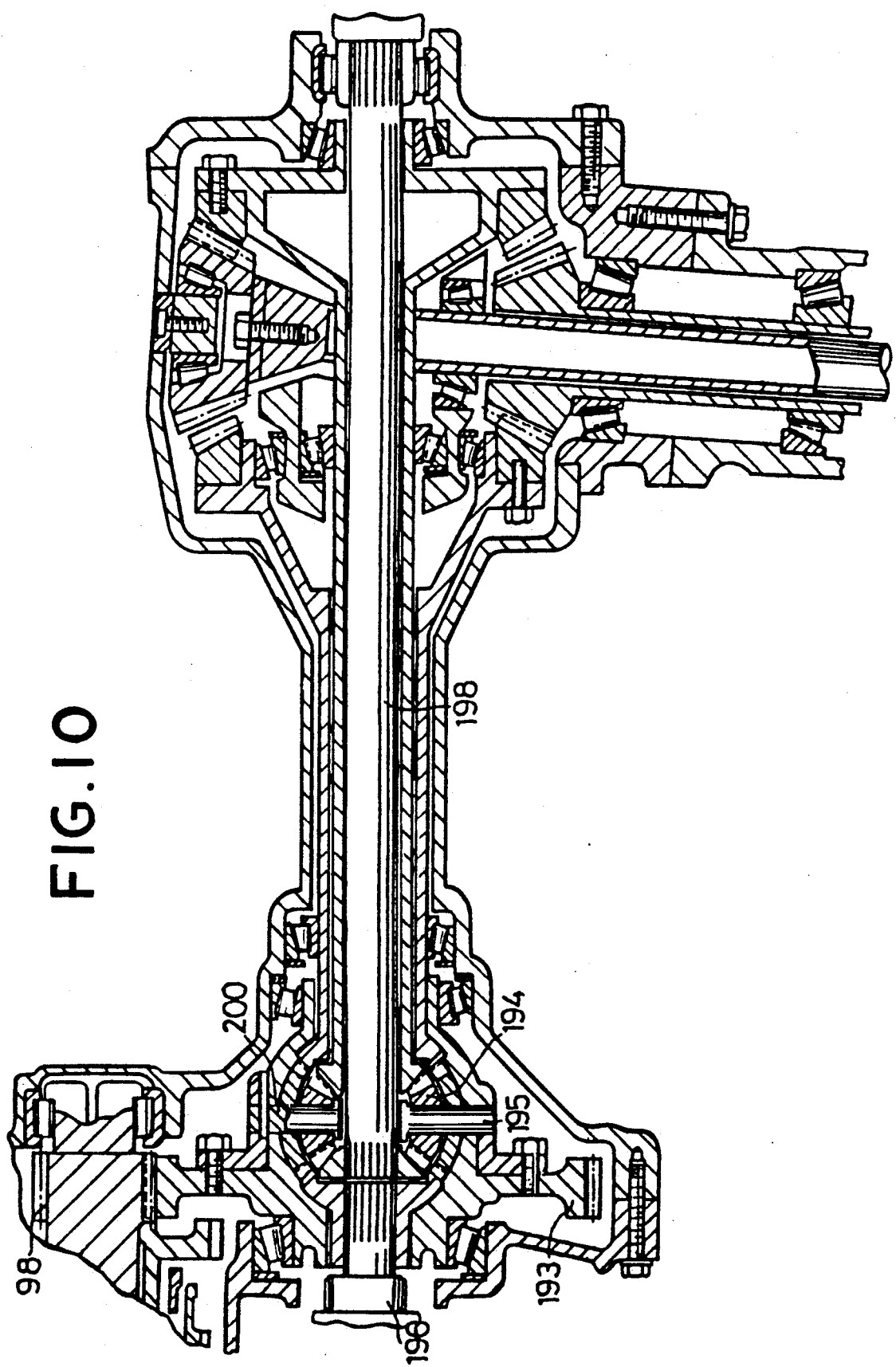
Figure 11:
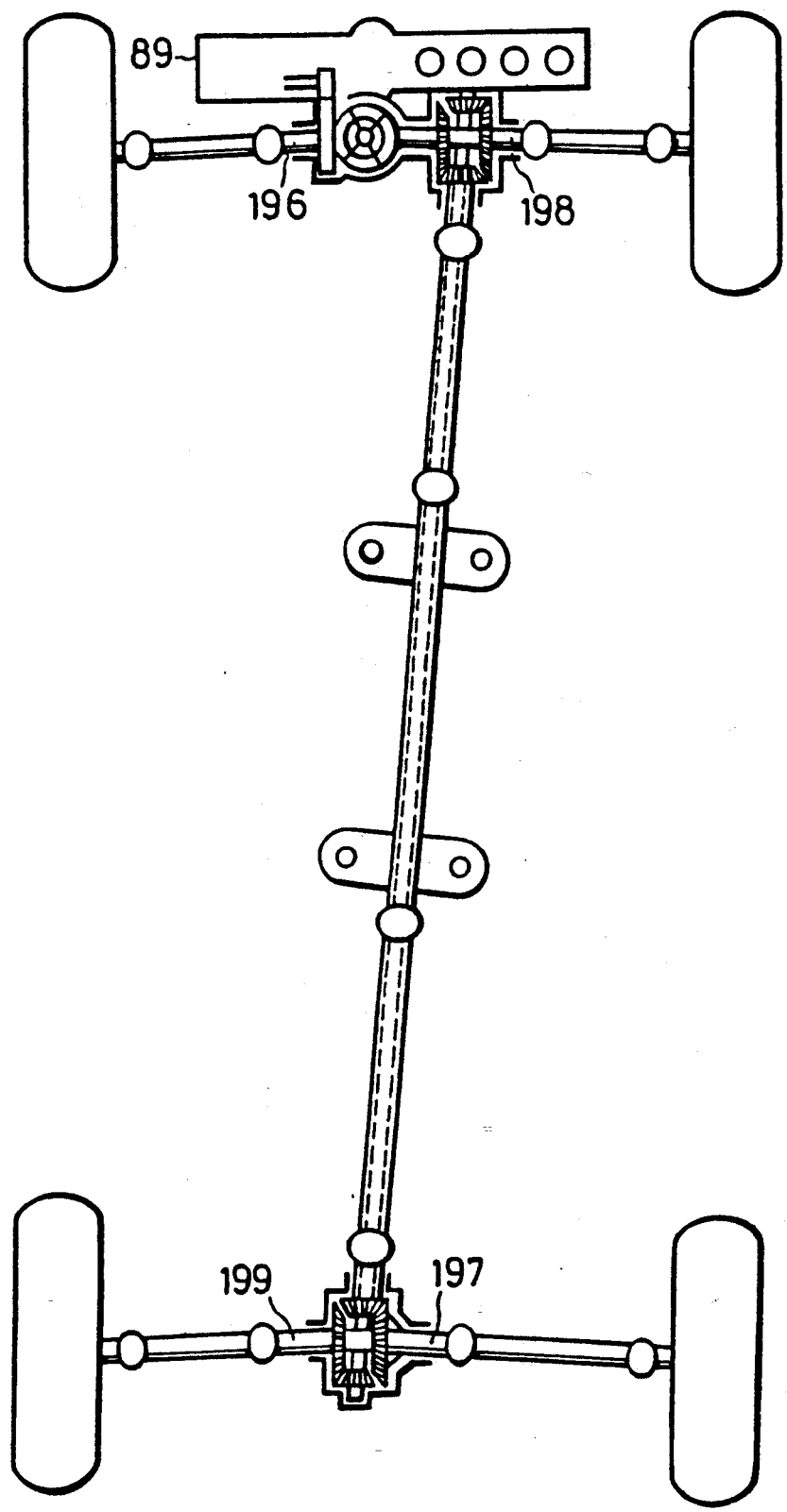

It is also possible to fill the rubber tube 113 with a fluid other than air and moreover, there may be provided some pressure-adjusting means (not shown) to control pressure from outside through the hose 116. Namely, these arrangement can be modified in several ways, according to different uses. Likewise, it is also possible to install the double-differential device, now separated to the right and left in the aforesaid preferred embodiment, now integrally in one position. Namely as shown in FIGS. 10-11, since the ring gear 193 is rotated by means of output of the engine via the drive gear 98 of the transmission 89, it is possible to make differential rotation through the inner and outer planetary gears between the left front wheel shaft 196 and the right rear wheel shaft 197 and between the right front wheel shaft 198 and the left rear wheel shaft 199 by rotation of the same carrier shaft 200 in a diagonal manner.

Figure 12:
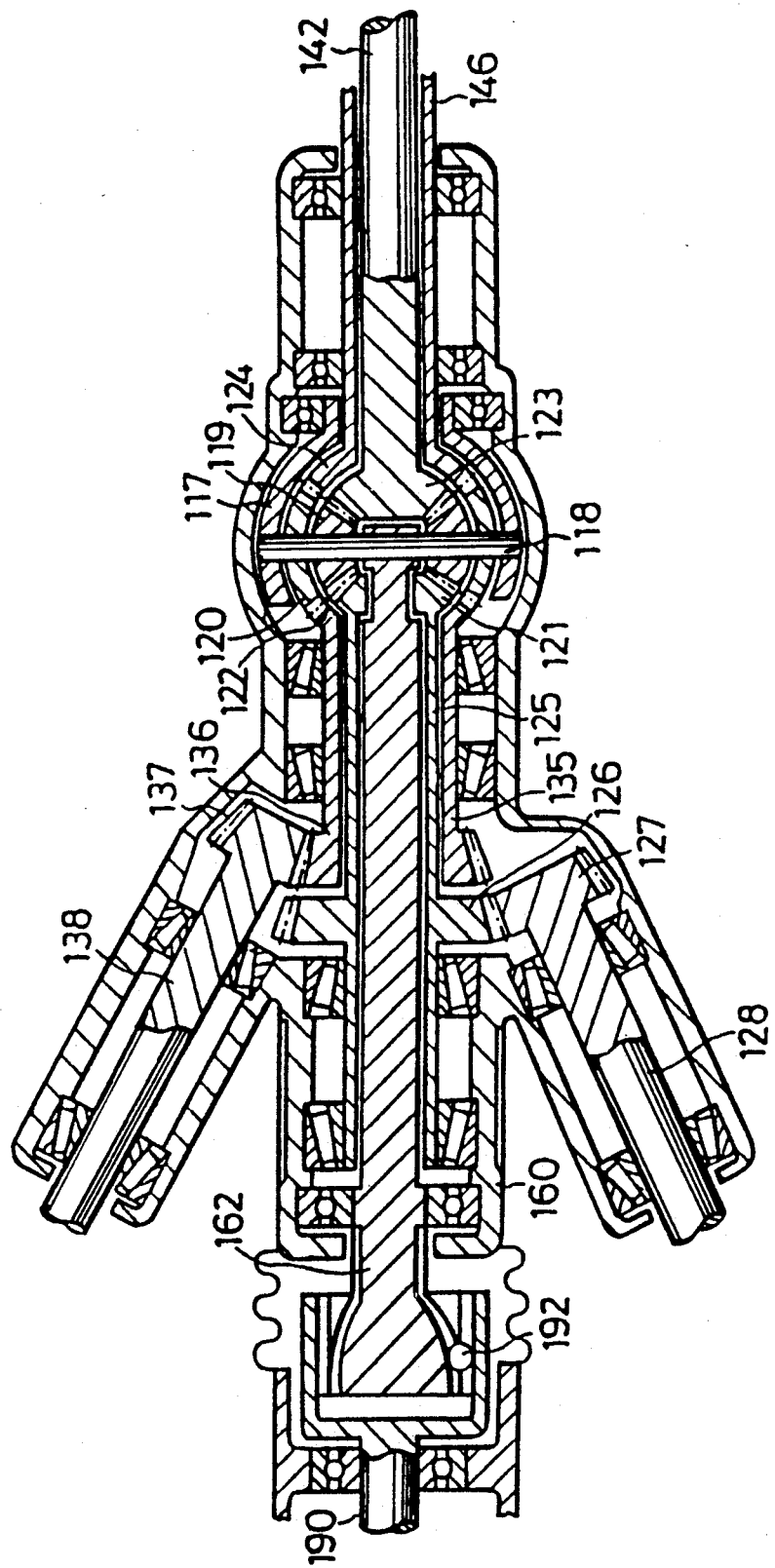
Figure 13:
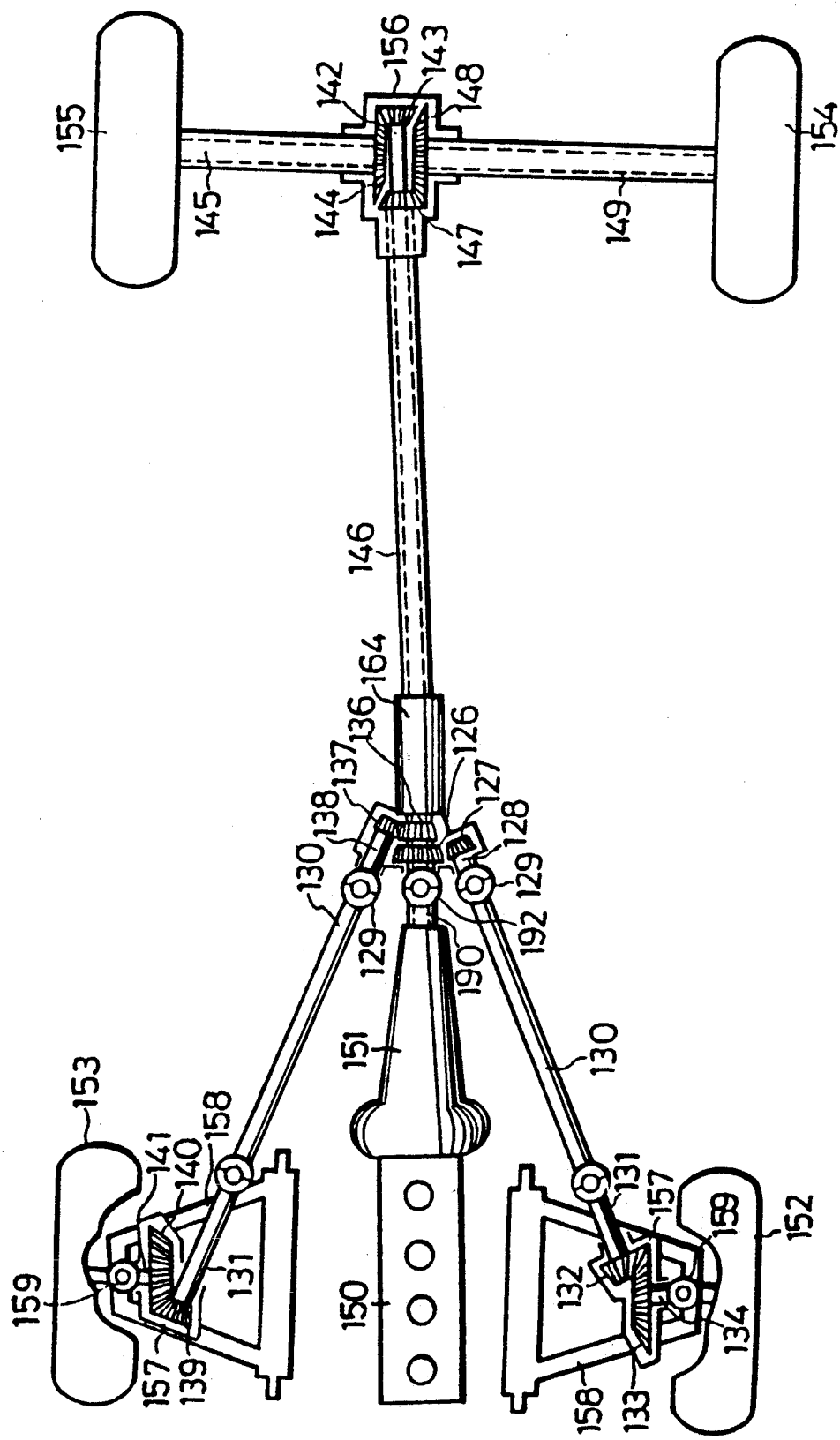

In this case, since the differential devices are centralized in one place, it is possible to make them compact and lightweight, which must be advantageously in point of manufacture. Next, the third preferred embodiment of the invention will be explained with reference to FIGS. 12-13.

This preferred embodiment uses a Y-shape power train such that the right and left drive gears in cooperative rotation with the inner and outer front side gears are arranged in meshing with the right and left speed-reduction gears respectively in cooperative rotation with the right and left wheel shafts so as to rotate the right and left front wheel shafts. The input shaft 162 is connected to the transmission shaft 190 through the ball joint 192. The inner and outer planetary gears 119,120 disposed at the planetary gear shaft 118 on the planetary carrier 117 are arranged in contact with the inner and outer side gears 121,122 respectively and simultaneously in contact with the inner and outer rear side gears 123,124 respectively rearwardly.

The inner front side gear 121 is adapted to rotate the left bevel gear 126 through the annular middle shaft 125 thereby to rotate the left small bevel gear 127, and also to rotate the left front wheel shaft 134 through the left shaft 128, universal joint 129, shaft 130, front shaft 131, left drive bevel gear 132 and left speed-reduction bevel gear 133. Also, the outer front side gear 122 acts to drive the right bevel gear 136 and the right small bevel gear 137 through the outer shaft 135 thereby to rotate the right front wheel shaft 141 through the right shaft 138, universal joint 129, shaft 130, front shaft 131, right drive bevel gear 139 and right speed-reduction bevel gear 140. In this structure, the right rear wheel shaft 145 is rotated through the inner rear side gears 123, inner shaft 142, rear drive gear 143 and right rear speed-reduction gear 144. In this case, the outer rear side gear 124 acts to drive the left rear wheel shaft 149 through the outer shaft 146, front drive gear 147 and left rear speed-reduction gear 148.

The output of the engine 150 serves to effect two kinds of differential rotation through the transmission 151 between the left front wheel shaft 134 and the right rear wheel shaft 145 as well as between the right front wheel shaft 141 and the left rear wheel shaft 149, certainly by means of rotation of the same planetary carrier shaft 118. Therefore, the right and left front wheels 152,153 and the right and left rear wheels 154,155 may run in the same direction as center diff-lock at the same time of turn in the case of conventional device for driving four wheels.

In contrast, according to the present invention, it is possible to directly rotate the front and rear drive gears 147, 143 without using a universal joint for the inner shaft 142 and the concentric outer shaft 146 for driving the right and left rear wheels 154,155.

Accordingly, the front and rear drive gears 147, 143 and the right and left speed-reduction gears 148,144 are housed in the gear box 156 which is disposed rotatable around the right and left rear wheel shafts 149, 145 as the center. Also, the casing 157 for the right and left drive bevel gears 132,139 as well as for the right and left speed-reduction bevel gears 133,140 is provided on the arm 158 of the known wishbone type as a suspension for the right and left wheels, 152,153.

The right and left front wheel shafts 134,141 act to drive the right and left front wheels 152,153 through the ball joint 159. Both the input shaft 162 and inner shaft 142 are arranged on a straight line and positioned as inclined, for example, at 3° to the center line of the car and the rear drive gear 147 does not come into contact with the left rear speed-reduction gear 148, according to the structure. By the way, although spiral gears are used for the right and left speed-reduction gears 148,144 in FIG. 13, it is possible to replace them by hypoid gears and to arrange differential devices as separated from each other forwardly and rearwardly. In the case of separating the differential devices forwardly and rearwardly, the casing 160 assumes an advantage of slender shape through the total length may become a little large. Also instead of the arm 158 of the wishbone type, needless to say, other suspensions may be used. Moreover, it is also possible to employ such structure that more than two worm gears each are provided, for example, on the planetary carrier and the front outer worm gear and the rear outer worm gear, and the front inner worm gear and the rear inner worm gear are adapted to make cooperative movements by means of spun gears on the worm shaft for differential rotation.

Figure 14:
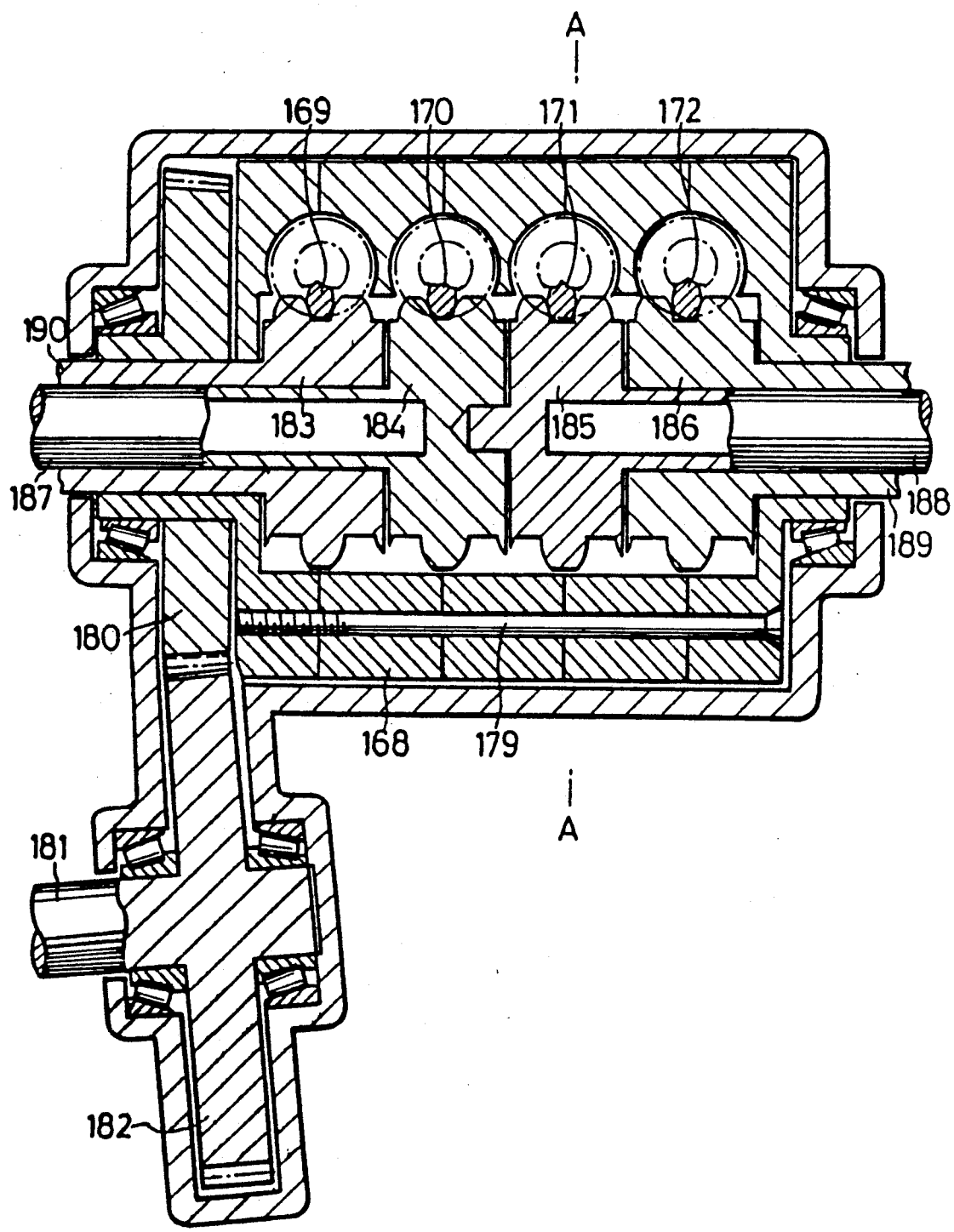
Figure 15:
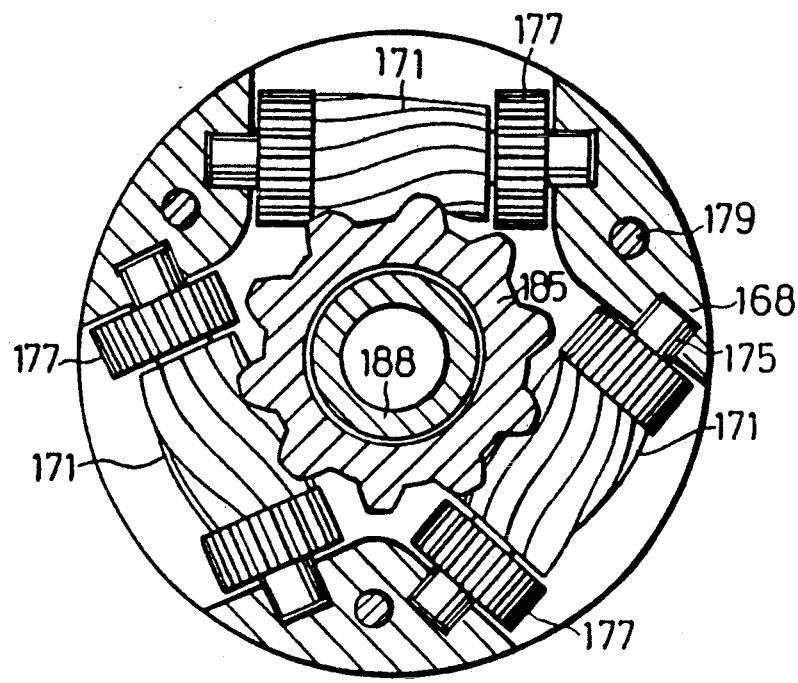
Figure 16:
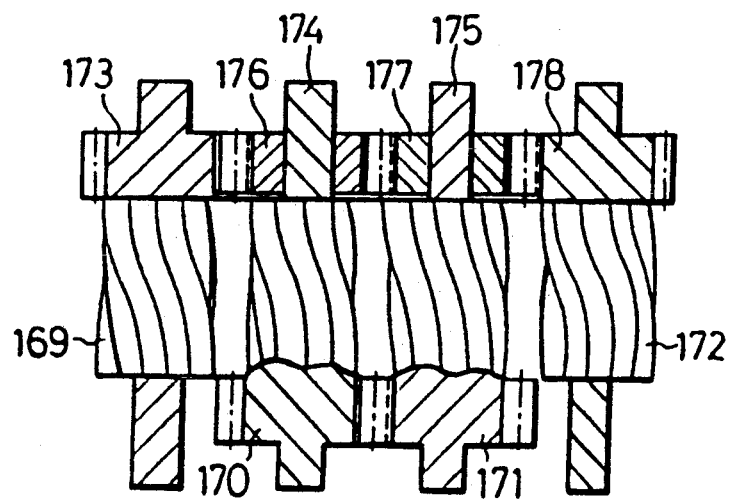
FIG. 16 is a structural view showing the arrangement of four worm gears.

FIGS. 14-15 show a preferred embodiment of the aforesaid structure.

Namely, each three worm gears 169, 170, 171, 172 are disposed in the planetary shaft 168 so that the front outer worm gear 169 may cooperatively rotate the cooperative gear 178 integral with the rear outer worm gear 172 through the cooperative gear 173 integral with the rear outer worm gear 172 and the intermediate gears 176, 177 rotating on the front inner and rear inner worm shafts 174,175.

The planetary carrier 168 is subdivided into five blocks and assembled by means of bolts 179, being integral with the transfer driven gear (bevel gear) 180.

The transmission shaft 181 serves to rotate the transfer drive gear 182 thereby to rotate the planetary carrier 168 through the transfer driven gear 180 meshing with the transfer driven gear 182.

When the planetary carrier 168 is rotated, there is a possibility of differential rotation as Torsen differential between the front outer worm gear 169 and the rear outer worm gear worm gear 172 and between the front inner worm gear 170 and the rear inner worm gear 171.

Numerals 183,184,185 and 186 designate front outer, front inner, rear inner and rear outer worm gears respectively.

Numeral 187,188 designate the inner shaft of double shaft and 189, 190 designate the outer shaft thereof.

According to the present preferred embodiment, the differential device is made compact and it can impart rotative power to each of the four wheels corresponding to driving torque. In the case of conventional device for driving four wheels, the torque allotted to one wheel is 25% as a maximum of the output of the engine. In contrast, in the case of the device according to the present invention, 50% of output as a maximum can be supplied to one wheel because of diagonal differential. Accordingly, it becomes possible to obtain a suitable distribution of torque, corresponding to each time's condition, which is found extremely advantageous in the case of off-road cars or the like.

Although the invention has been explained with reference to several kinds of most desirable embodiment hereinbefore, yet it is apparent that the assembling and arrangement of the parts of the preferred embodiments can be modified in various ways without departing from the spirit and scope of the present invention.

What is claimed is:

1. A device for driving four wheels of a car at all times, comprising differential means provided between a left front wheel shaft and a right rear wheel shaft and another differential means provided between a right front wheel shaft and a left rear wheel shaft, for driving the left front wheel shaft and the right rear wheel shaft and the right front wheel shaft and the left rear wheel shaft by the same driving source, said two differential means each comprising a planetary gear mechanism and being combined in a single unit comprising a double-differential means, wherein rotation of inner and outer front side gears meshing with inner and outer front planetary gears serves to rotate a left front pinion, right rear pinion, left front hypoid gear and right rear hypoid gear respectively through an inner shaft of a double shaft which comprises said inner shaft inside a tubular outer shaft and is inclined to the front and rear wheel shafts, and rotation of inner and outer rear side gears of said double-differential means serves to rotate a right front pinion and left rear pinion and a right front hypoid gear and left rear hypoid gear respectively through the outer shaft of said double shaft, thereby driving the right and left front wheel shafts and the right and left rear wheel shafts respectively.

2. A device for driving four wheels of a car at all times, as claimed in claim 1, wherein the outer shaft of the double shaft is made of light alloy and the inner shaft is made of steel.

3. A device for driving four wheels of a car at all times comprising a double-differential means comprising first differential means between a left front wheel shaft and a right rear wheel shaft and second differential means between a right front wheel shaft and a left rear wheel shaft, said double differential means having an input gear meshing with a drive gear on an engine drive shaft, a double shaft comprising an inner shaft concentric in a tubular outer shaft extending from said double-differential means to a rear wheel reduction gear box, a pinion on said inner shaft in said rear wheel reduction gear box meshing with a hypoid gear on one of two rear wheel shafts and a pinion on said outer shaft in said rear wheel reduction gear box meshing with a hypoid gear on another of said two rear wheel shafts, and said double shaft extending from said double-differential means to a front wheel reduction gear box, a pinion on said inner shaft in said front wheel reduction gear box meshing with a hypoid gear on one of two front wheel shafts and a pinion on said outer shaft in said front wheel reduction gear box meshing with a hypoid gear on another of said two front wheel shafts, said tubular outer shaft of said double shaft being made of a light alloy and said inner shaft of said double shaft being made of steel to make resistance of inertia uniform.

4. A device for driving four wheels of a car at all times according to claim 3, in which said double shaft is inclined with respect to front and rear wheel shafts.

* * * * *